United States Patent
Yasuda

(10) Patent No.: US 11,440,658 B2
(45) Date of Patent: Sep. 13, 2022

(54) UNMANNED AERIAL VEHICLE WITH A CONTROLLER FOR CONTROLLING THE BACKWARD AND FORWARD ROTATION OF A SPOOLING WINCH

(71) Applicant: GLOBERIDE, Inc., Higashi Kurume (JP)

(72) Inventor: Hiromu Yasuda, Higashi Kurume (JP)

(73) Assignee: GLOBERIDE, Inc., Tokyo (JP)

( * ) Notice: Subject to any disclaimer, the term of this patent is extended or adjusted under 35 U.S.C. 154(b) by 383 days.

(21) Appl. No.: 16/727,745

(22) Filed: Dec. 26, 2019

(65) Prior Publication Data

US 2020/0207471 A1 Jul. 2, 2020

(30) Foreign Application Priority Data

Dec. 28, 2018 (JP) ............................. JP2018-246909

(51) Int. Cl.
*B64C 39/02* (2006.01)
*B64C 27/08* (2006.01)
(Continued)

(52) U.S. Cl.
CPC ............ *B64C 39/024* (2013.01); *B64C 27/08* (2013.01); *B64D 1/12* (2013.01); *B64D 1/22* (2013.01);
(Continued)

(58) Field of Classification Search
CPC .... B64D 1/12; B64D 1/22; B64D 1/02; B64C 2201/128
See application file for complete search history.

(56) References Cited

U.S. PATENT DOCUMENTS 9,174,733 B1 11/2015 Burgess et al.
10,071,804 B1 9/2018 Buchmueller et al.
(Continued)

FOREIGN PATENT DOCUMENTS

JP 61-257889 A 11/1986
JP H09278382 A 10/1997
(Continued)

OTHER PUBLICATIONS

The Extended European Search Report dated Jun. 2, 2020, of counterpart European Application No. 19219659.0.
(Continued)

*Primary Examiner* — Joshua J Michener
*Assistant Examiner* — Arfan Y. Sinaki
(74) *Attorney, Agent, or Firm* — K&L Gates LLP

(57) ABSTRACT

This unmanned aerial vehicle has: a main body; a plurality of rotary wings provided on the main body; a wire for suspending an object from the main body; a hook attached to the wire; a winch for rotatably supporting a spool on which the wire is wound in the forward and backward directions, winding the wire by rotating the spool in the forward direction and unwinding the wire by rotating the spool in the backward direction; and a controller for restricting the backward rotation of the spool when the tension of the wire becomes less than a first threshold value, and restricting the forward rotation of the spool when the tension of the wire becomes less than the first threshold value and becomes equal to or less than a second threshold value, which is less than a gravitational force acting on the hook.

3 Claims, 5 Drawing Sheets

(51) Int. Cl.
*B64D 1/12* (2006.01)
*B64D 1/22* (2006.01)
*B64D 1/02* (2006.01)

(52) U.S. Cl.
CPC .. *B64C 2201/024* (2013.01); *B64C 2201/108* (2013.01); *B64C 2201/128* (2013.01); *B64D 1/02* (2013.01)

(56) References Cited

U.S. PATENT DOCUMENTS

| | | | | |
|---|---|---|---|---|
| 2010/0051890 | A1* | 3/2010 | Lauder | B64C 27/10 254/382 |
| 2016/0059963 | A1* | 3/2016 | Burgess | B64D 9/00 701/49 |
| 2017/0106978 | A1* | 4/2017 | Sopper | B65D 5/18 |
| 2017/0197718 | A1* | 7/2017 | Buchmueller | B64C 17/00 |
| 2018/0072404 | A1 | 3/2018 | Prager et al. | |
| 2018/0244391 | A1* | 8/2018 | Curran | B64D 1/22 |
| 2018/0312247 | A1* | 11/2018 | Ichihara | B64C 39/02 |

FOREIGN PATENT DOCUMENTS

| | | |
|---|---|---|
| JP | 2000-335870 A | 12/2000 |
| JP | 2002-128455 A | 5/2002 |
| JP | 2017-87898 A | 5/2017 |
| WO | 2017078118 A1 | 5/2017 |
| WO | 2018/194026 A1 | 10/2018 |

OTHER PUBLICATIONS

European Office Action for related European Application No. 19219659.0; action dated Mar. 9, 2022; (5 pages).

Japanese Office Action for related Japanese Application No. 2018-246909; action dated Jan. 4, 2022; (8 pages).

* cited by examiner

UNMANNED AERIAL VEHICLE WITH A CONTROLLER FOR CONTROLLING THE BACKWARD AND FORWARD ROTATION OF A SPOOLING WINCH

TECHNICAL FIELD

This disclosure relates to unmanned aerial vehicles. More specifically, the disclosure relates to an unmanned aerial vehicle having a winch for winding and unwinding a wire by a driving force from a driving source.

BACKGROUND

An unmanned aerial vehicle having a winch for winding and unwinding a wire by a driving force from a driving source such as an electric motor is known. This type of winch winds a wire on a spool by rotating the spool in the forward direction by driving a motor and conversely, unwinds the wire from the rotating body by rotating the spool in the backward direction. When delivering a cargo, the unmanned aerial vehicle is flown to the skies over the destination to lower the cargo attached to the wire there by unwinding the wire while hovering in the skies.

Japanese Patent Application Publication No. 2017-87898 discloses an unmanned aerial vehicle capable of transporting cargo. The unmanned aerial vehicle is provided with a winch for unwinding and winding a wire. The winding and unwinding of the winch is controlled by the operator via a transceiver or automatically according to a program as a function of an autonomous flight program.

A cargo suspended by a wire from an unmanned aerial vehicle may be lifted or lowered when the unmanned aerial vehicle is in a position that is not sufficiently visible to the operator. Therefore, it is not easy to control the winch when lifting and lowering the cargo. If the backward rotation of the spool of the winch is not properly restricted when the cargo is unloaded from the unmanned aerial vehicle that has reached the skies over the destination, the wire may become loose after the cargo is grounded, and the loose wire may become entangled with the cargo or the hook holding the cargo, or may become entangled in the winch. Further, if sufficient driving force is not applied to the spool of the winch after the cargo is unloaded, the wire unwound to the ground and the hook attached to the wire cannot be wound up to the unmanned aerial vehicle. If the unmanned aerial vehicle is flown with the wire unwound when returning from the delivery destination, the wire and the hook tend to be caught by obstacles.

In the above-mentioned Japanese Patent Application Publication No. 2017-87898, winding and unwinding of the winch from the unmanned aerial vehicle is conventionally and automatically controlled only in accordance with a program, and the above-mentioned problem remains unsolved.

It could therefore be helpful to facilitate lifting and lowering of a cargo from an unmanned aerial vehicle. One of the more specific advantages is to suppress loosening of a wire during unloading of a cargo from an unmanned aerial vehicle. One of even more specific advantages is to allow the hook to be lifted to a predetermined position after unloading of a cargo. Other advantages will become apparent upon reference to this specification as a whole.

SUMMARY

I thus provide:

An unmanned aerial vehicle comprises: a main body; a plurality of rotary wings provided on the main body; a wire for suspending an object from the main body; a hook attached to the wire; a winch for rotatably supporting a spool on which the wire is wound in the forward and backward directions, winding the wire by rotating the spool in the forward direction, and unwinding the wire by rotating the spool in the backward direction; and a controller for restricting the backward rotation of the spool when the tension of the wire becomes less than a first threshold value, and restricting the forward rotation of the spool when the tension of the wire becomes less than the first threshold value, and becomes equal to or less than a second threshold value which is less than a gravitational force acting on the hook.

The first threshold value may be greater than a gravitational force acting on the hook.

The first threshold value may be less than the sum of the gravitational forces acting on the hook and the cargo.

I thus enable smooth lifting and lowering of cargo from unmanned aerial vehicles.

BRIEF DESCRIPTION OF THE DRAWINGS

In FIG. 3a, a wire is unwound to lower a cargo.

In FIG. 3b, a cargo is grounded.

In FIG. 3c, a cargo has been released from a hook.

In FIG. 3d, a wire is wound up to retrieve a hook.

DESCRIPTION OF THE NUMERICAL REFERENCES

1 Unmanned aerial vehicle
10 Main body
11 Arm
12 Support
12a and 12b Motors
13 Rotary wing
14 Sensor
15 Winch
16 Hook
20 Wire
30 Controller
M Cargo

DETAILED DESCRIPTION

Hereinafter, various examples will be described with reference to drawings as appropriate. The same numerical references are assigned to components common to the respective drawings. It should be noted that the drawings are not necessarily scaled for convenience of explanation.

Figure 1:
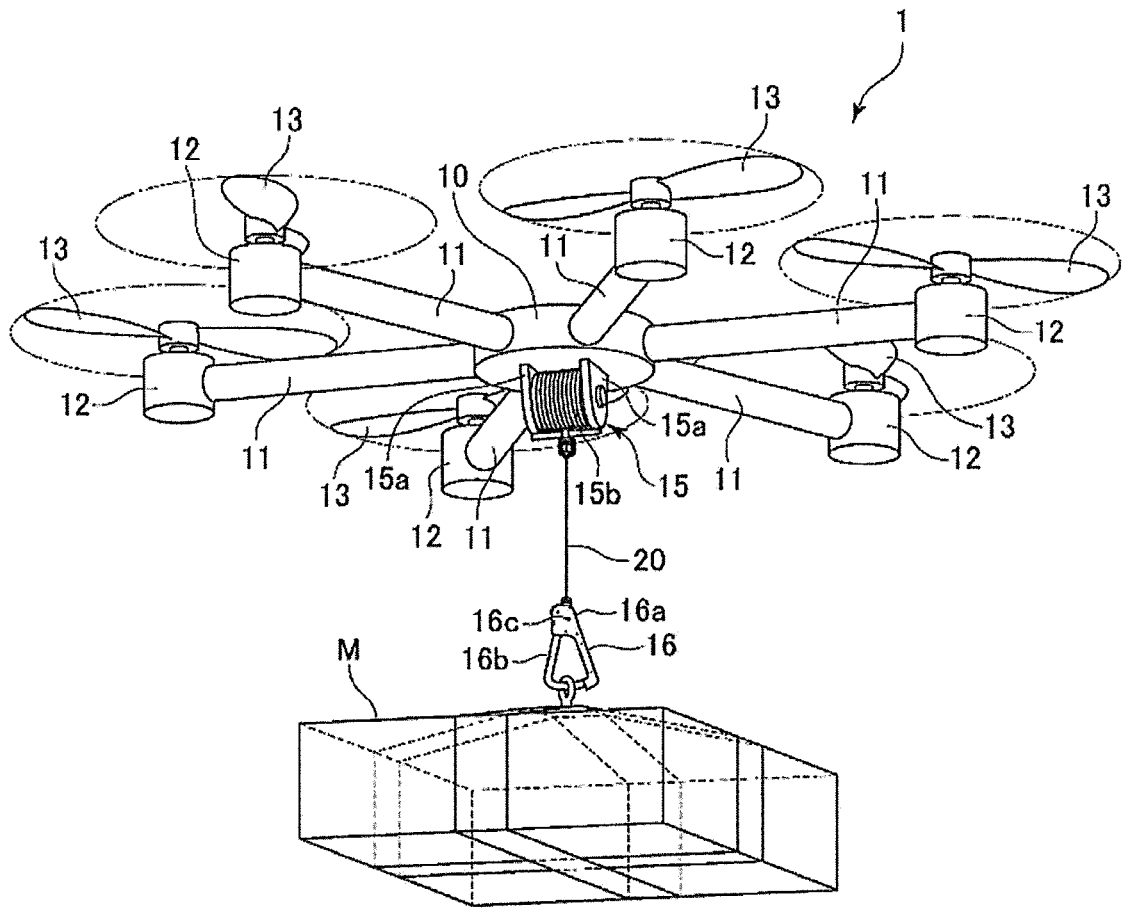
FIG. 1 shows a perspective view schematically indicating an unmanned aerial vehicle according to an example.
Figure 2:
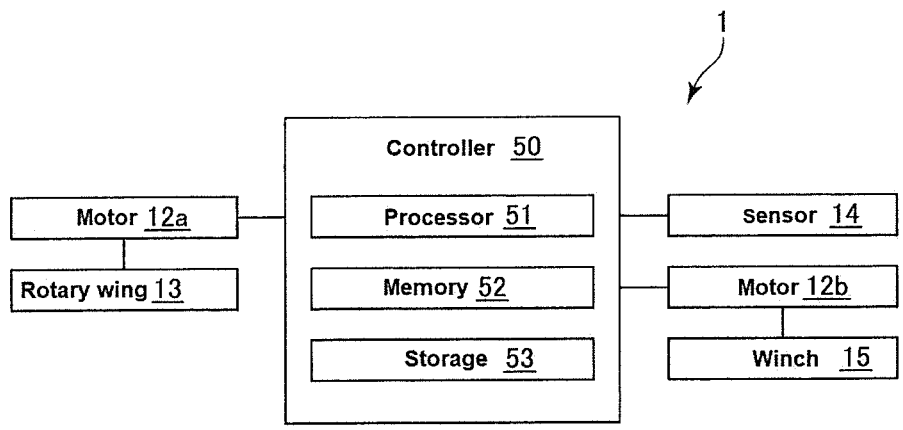
FIG. 2 shows a block diagram illustrating the functions of the unmanned aerial vehicle in FIG. 1.

With reference to FIGS. 1 and 2, an unmanned aerial vehicle 1 according to an example will be described. FIG. 1 shows a perspective view schematically indicating the unmanned aerial vehicle 1 according to an example, and FIG. 2 shows a block diagram indicating the functions of the unmanned aerial vehicle 1.

As used herein, an "unmanned aerial vehicle" means an aerial vehicle that can be remotely operated, or is capable to fly autonomously, without a physical human presence within or on the aerial vehicle. The unmanned aerial vehicle 1 is, for example, a multicopter having a plurality of rotary wings.

As shown in FIG. 1, the unmanned aerial vehicle 1 according to an example includes a main body 10, six arms 11 extending outward from the main body 10, six supports 12 provided at outer ends of the respective six arms, and six rotary wings 13 provided on each of the supports 12. The rotary wings 13 are provided on the main body 10 via the arms 11 and the supports 12. The unmanned aerial vehicle 1 may further include a winch 15, a hook 16 and a wire 20.

The support 12 rotatably supports the rotary wing 13. The support 12 accommodates a drive source for providing a rotational driving force to the rotary wing 13. The drive source is, for example, a motor 12a which will be described later. The rotary wing 13 is constructed and arranged to provide thrust to the unmanned aerial vehicle 1 during rotation.

In the illustrated example, the unmanned aerial vehicle 1 suspends an object M with the wire 20. The object M suspended from the unmanned aerial vehicle 1 is any object that can be suspended by the unmanned aerial vehicle 1. The object M is, for example, a camera, lighting device, speaker, microphone, sensor, fire extinguishing device, a cargo and other objects.

One end of the wire 20 is attached to the winch 15, and the other end thereof is attached to the hook 16. The wire 20 is guided from the winch 15 to the hook 16 via a guide member provided on the lower surface of the winch 15.

The wire 20 may be a single wire or a twisted wire made of a metal material, synthetic resin material or other materials. Suitable wire 20 is selected depending on the weight of the object M to be suspended, the environment of use or other factors. The wire 20 is desirably flexible enough to be routed from the winch 15 through the guide member to the hook 16.

The winch 15 has a pair of plate-like flanges 15a and a spool 15b provided between the pair of flanges 15a. The wire 20 is wound on the outer peripheral surface of the spool 15b of the winch 15. The spool 15b is supported by a pair of flanges 15a to be rotatable around a rotation axis. When the winch 15 is driven, the spool 15b rotates in the forward or backward direction around the rotation axis. When the spool 15b rotates in the forward direction, the wire is wound on the spool 15b. Conversely, when the spool 15b rotates in the backward direction, the wire is unwound from the spool 15b. The driving power for driving the winch 15 may be supplied from a battery housed in the main body 10. The winch 15 may be unwound and wound according to a predetermined algorithm or under instructions from a remote operator.

The hook 16 is configured to be capable of holding the object M. The hook 16 may include a hook body 16a and a movable member 16b that is rotatable relative to the hook body 16a around an axis 16c. The movable member 16b can take either a closed posture in which a closed loop is made by the hook body 16a and the movable member 16b as a result of the axis 16c of the movable member 16b and the opposite end coming in contact with the hook body 16a, or an open posture in which the axis 16c of the movable member 16b and the opposite end are separated from the hook body 16a. The movable member 16b may be controlled to take a closed posture when the hook 16 holds a cargo M, and an open posture when the cargo M is released from the hook 16. In one example, the movable member 16b may maintain the closed posture when the cargo M is held by the hook 16 and a certain load or more is applied to the movable member 16b as shown in FIG. 1, and may be automatically switched from the closed posture to the open posture when the load applied to the movable member 16b becomes less than a predetermined value or when the load applied to the movable member 16b is lost. Automatic release hooks are generally known, which are configured to switch the movable member to an open posture to release a cargo when the load is detected to be less than a certain value. The automatic release hook is also referred to as a no-load release hook or an automatic cargo loading hook. Such automatic release hooks are disclosed in Japanese Patent Application Publication No. S61-257889, Japanese Patent Application Publication 2000-335870 and Japanese Patent Application Publication No. 2002-128455. These automatic release hooks can be used as the hooks 16. Instead of the automatic release hook, the hook 16 may be a hook which is locked to prevent the cargo M from coming off when the cargo is held, and is manually unlocked when the cargo M is unloaded. As a type of hook that is manually unlocked, for example, a carabiner hook can be used.

Next, the functions of the unmanned aerial vehicle 1 will be described in more detail with reference to FIG. 2. As illustrated, the unmanned aerial vehicle 1 includes a controller 50, the motor 12a for outputting a rotational driving force to the rotary wing 13, a motor 12b for outputting a rotational driving force to the winch 15, a sensor 14 and the winch 15.

The controller 50 includes a computer processor 51, a memory 52 and a storage 53. The computer processor 51 is an arithmetic device that loads a flight control program defining a flight control algorithm from the storage 53 or other storage into the memory 52, and executes instructions contained in the loaded flight control program. In addition to the flight control program, the computer processor 51 can execute various programs related to the realization of the functions of the unmanned aerial vehicle 1. The controller 50 may be configured to control the rotational speed of the motor 12a and the motor 12b by outputting a pulse width modulation (PWM) signal to the motor 12a and the motor 12b.

In one example, the sensor 14 is a tension sensor that detects tension on the wire 20. For example, a strain gauge may be used as the sensor 14. In addition to the sensor 14, the unmanned aerial vehicle 1 may include a gyro sensor, acceleration sensor, geomagnetic sensor, barometric pressure sensor and various other sensors. These sensors are connected to the controller 50 as necessary.

The controller 50, the motor 12b, the sensor 14, a communication device and a battery may be accommodated in the main body 10. In addition to the illustrated components, the unmanned aerial vehicle 1 may include communication devices, batteries and various other devices necessary for its own operation. These components are connected to the controller 50 as necessary.

The controller 50 may be configured to control the attitude and position of the unmanned aerial vehicle 1 by controlling the rotational speed of the rotary wing 13 according to a flight control algorithm based on detection information of various sensors provided in the unmanned aerial vehicle 1.

The storage 53 may store a threshold value for restricting the rotation of the spool 15b. The storage 53 may store, for example, a first threshold value S1 for restricting the backward rotation of the spool 15b and a second threshold value S2 for restricting the forward rotation of the spool 15b. The controller 50 can restrict the rotation of the spool 15b, comparing the tension of the wire 20 detected by the sensor 14 with the first and the second threshold values. In one example, the controller 50 controls the rotation of the motor 12b so that the spool 15b does not rotate in the backward direction when the tension of the wire 20 is less than or equal to the first threshold value. As a result, when the tension of the wire 20 is equal to or less than the first threshold value, the wire 20 is not unwound. Conversely, when the tension of the wire 20 is greater than the first threshold value, the controller 50 may drive the motor 12b such that the spool 15b rotates in the backward direction. In one example, the first threshold value S1 is supposed to be greater than the gravitational force m1 acting on the hook 16, that is, m1<S1. In one example, the first threshold value is supposed to be less than the sum (m1+m2) of the gravitational force m1 acting on the hook 16 and the gravitational force m2 acting on the cargo M to be transported, that is, S1< (m1+m2.) In one example, m1<S1< (m1+m2) may be used. The first threshold value S1 and the second threshold value S2 may be changed by an operator of the unmanned aerial vehicle 1 or an operator involved in the transportation of the cargo M. For example, when instead of the hook 16, another hook is attached to the wire 20, the values of the first threshold value S1 and/or the second threshold value S2 may be changed according to the weight of the new hook. Further, the first threshold value S1 may be changed according to the weight of the cargo M to be transported.

In one example, the controller 50 controls the rotation of the motor 12b so that the spool 15b does not rotate in the forward direction when the tension of the wire 20 is equal to or less than the second threshold value. As a result, when the tension of the wire 20 is equal to or less than the second threshold value, the wire 20 is not wound. Conversely, when the tension applied to the wire 20 is greater than the second threshold value, the controller 50 can drive the motor 12b so that the spool 15b rotates in the forward direction. In one example, the second threshold value is supposed to be less than the first threshold value and less than the gravitational force m1 acting on the hook 16.

Next, with reference to FIGS. 3a to 3d, a method of unloading the cargo M from the unmanned aerial vehicle 1 will be described. In FIGS. 3a to 3d, it is assumed that the unmanned aerial vehicle 1 carrying the cargo M has reached the skies over the destination to unload the cargo M there.

Figure 3A:
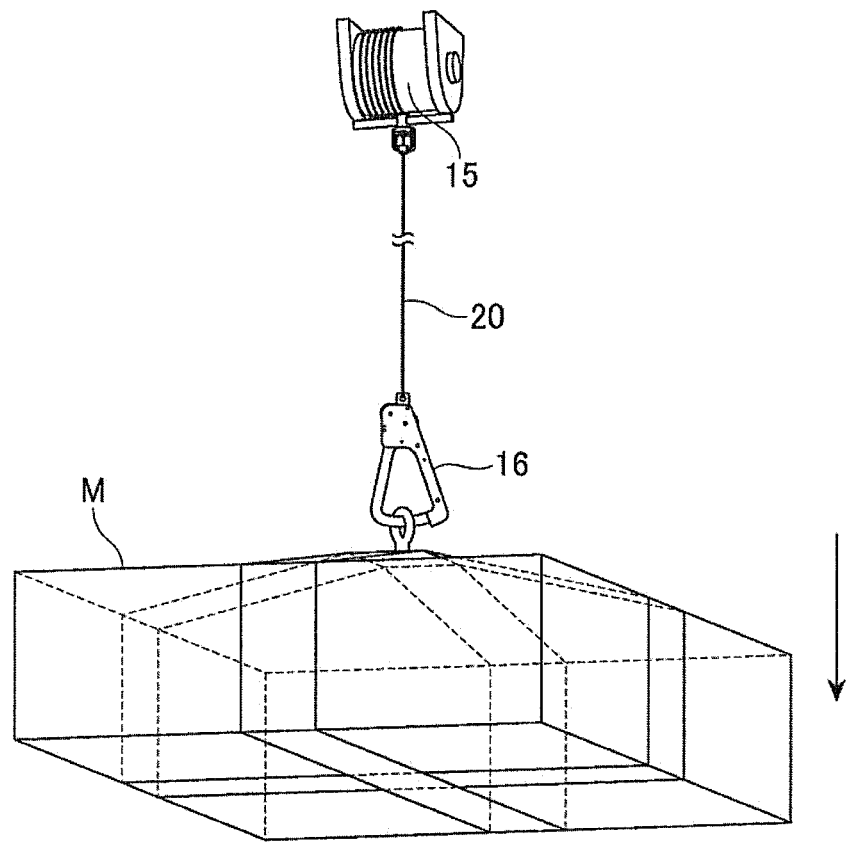
FIG. 3a shows a view illustrating the unwinding and winding of a wire from the unmanned aerial vehicle in FIG. 1.
Figure 3A:
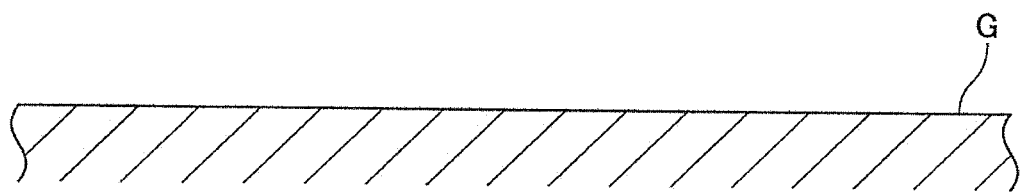

When the unmanned aerial vehicle 1 reaches the skies over the destination, first, as shown in FIG. 3a, the rotation of the motor 12b is controlled to rotate the spool 15b in the backward direction, and the wire 20 is unwound from the spool 15b. Since the cargo M is held by the wire 20 via the hook 16, the cargo M can be lowered from the sky toward the ground by unwinding the wire 20. The backward rotation of the spool 15b may be controlled under instructions from the operator, or may be controlled automatically on the basis of the control of the controller 50 when detecting that the spool 15b has reached the skies over the destination (not under instructions from the operator.) The backward rotation of the motor 12b is prohibited when the tension T of the wire 20 is equal to or less than the first threshold value S1. When the cargo M is lowered from the sky toward the ground G, the tension T exerted on the wire 20 is equal to (m1+m2) or greater than (m1+m2) by the gravitational force exerted on the wire 20, that is, (m1+m2)≤ T holds. Therefore, by making the first threshold value S1 less than the total gravitational forces (m1+m2) of the hook 16 and the cargo M (namely, by letting S1< (m1+m2,)) the tension T acting on the wire 20 becomes greater than the first threshold value S1 (S1<T.) Accordingly, the backward rotation of the spool 15b is not restricted while the cargo M is lowered from the sky toward the ground G. Therefore, the cargo M can be smoothly lowered from the sky to the ground G.

Figure 3B:
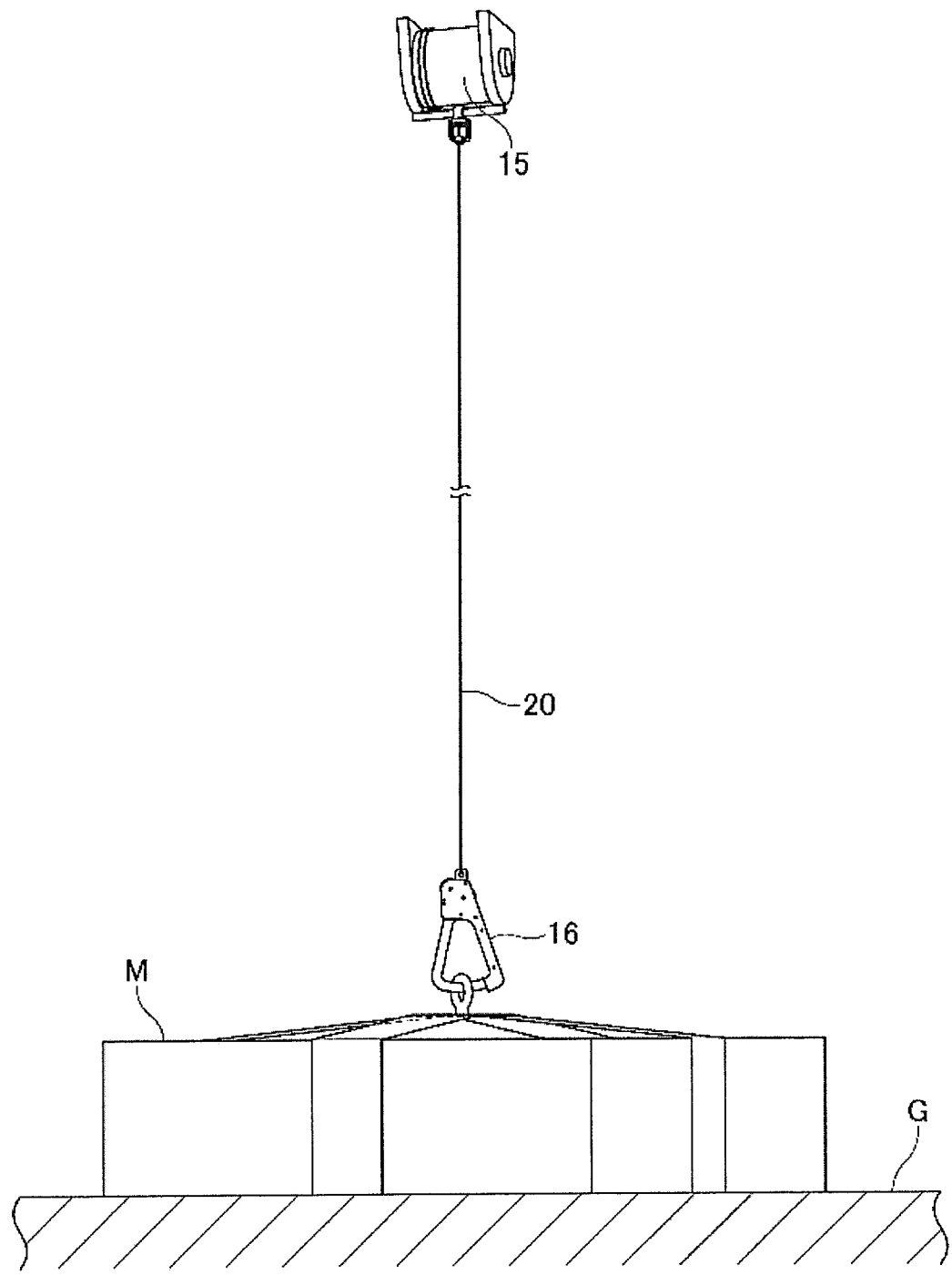
FIG. 3b shows a view illustrating the unwinding and winding of a wire from the unmanned aerial vehicle in FIG. 1.
Figure 3C:
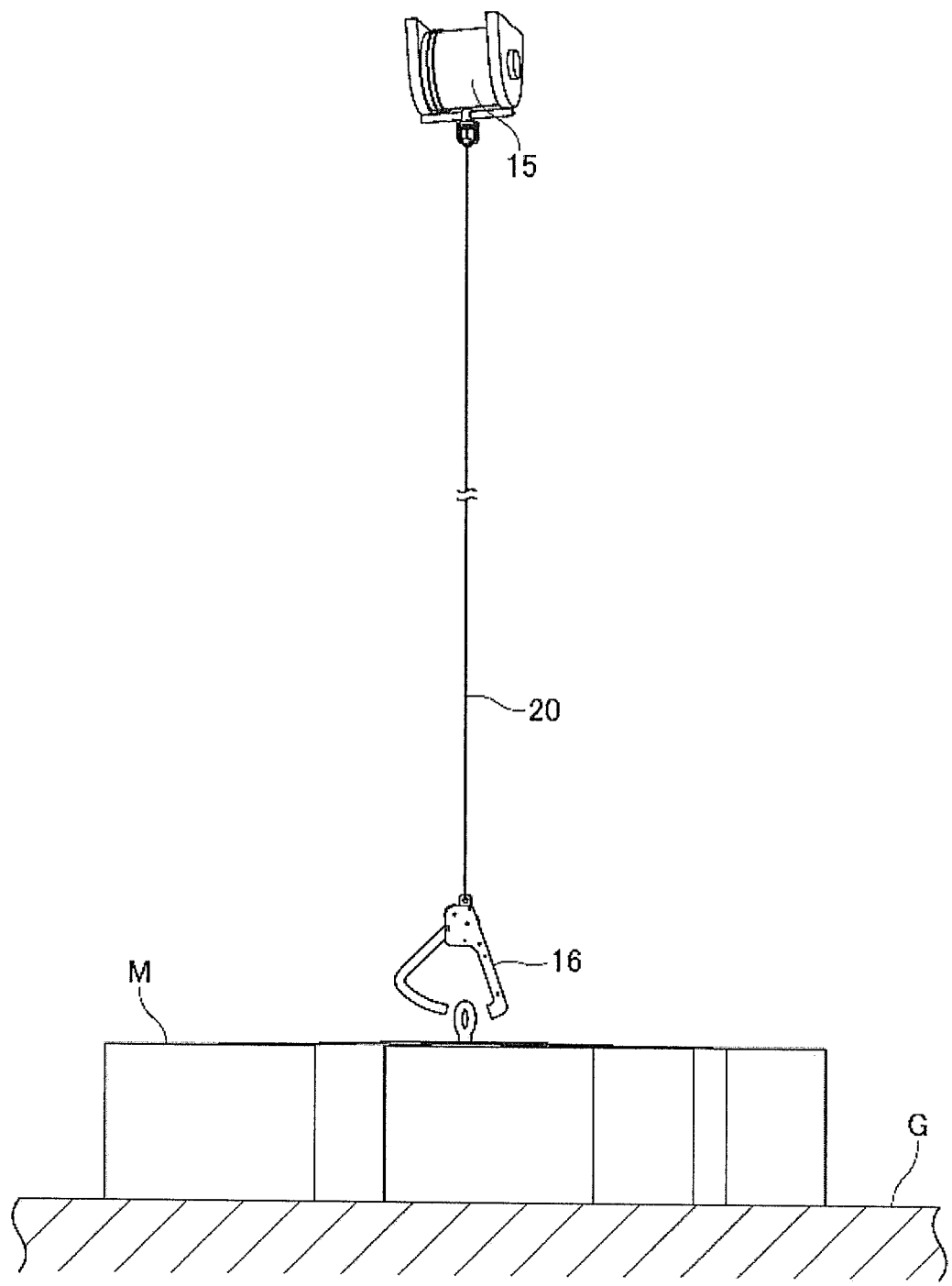
FIG. 3c shows a view illustrating the unwinding and winding of a wire from the unmanned aerial vehicle in FIG. 1.

As the wire 20 continues to be unwound, the cargo M reaches the ground G as shown in FIG. 3b. When the cargo M reaches the ground G, the tension T exerted on the wire 20 changes. More specifically, since the cargo M is supported upward by the ground G, the tension T exerted on the wire 20 becomes smaller than before the cargo M reaches the ground G. When the cargo M reaches the ground G, the cargo M is released from the hook 16 by manipulation of an operator on the ground G as shown in FIG. 3c, or automatically if the hook 16 is an automatic release hook. When the cargo M is released from the hook 16, the tension T of the wire 20 becomes substantially equal to the gravitational force m1 acting on the hook 16, that is, T≈m1 holds. Therefore, by making the first threshold value S1 greater than the gravitational force m1 acting on the hook 16 (namely, by letting m1<S1) the tension T acting on the wire 20 becomes less than the first threshold value S1 (T<S1,) and, therefore, after the cargo M is released from the hook 16, the wire 20 is not further unwound. It is thus possible to prevent the wire 20 from loosening when the cargo M is released.

Figure 3D:
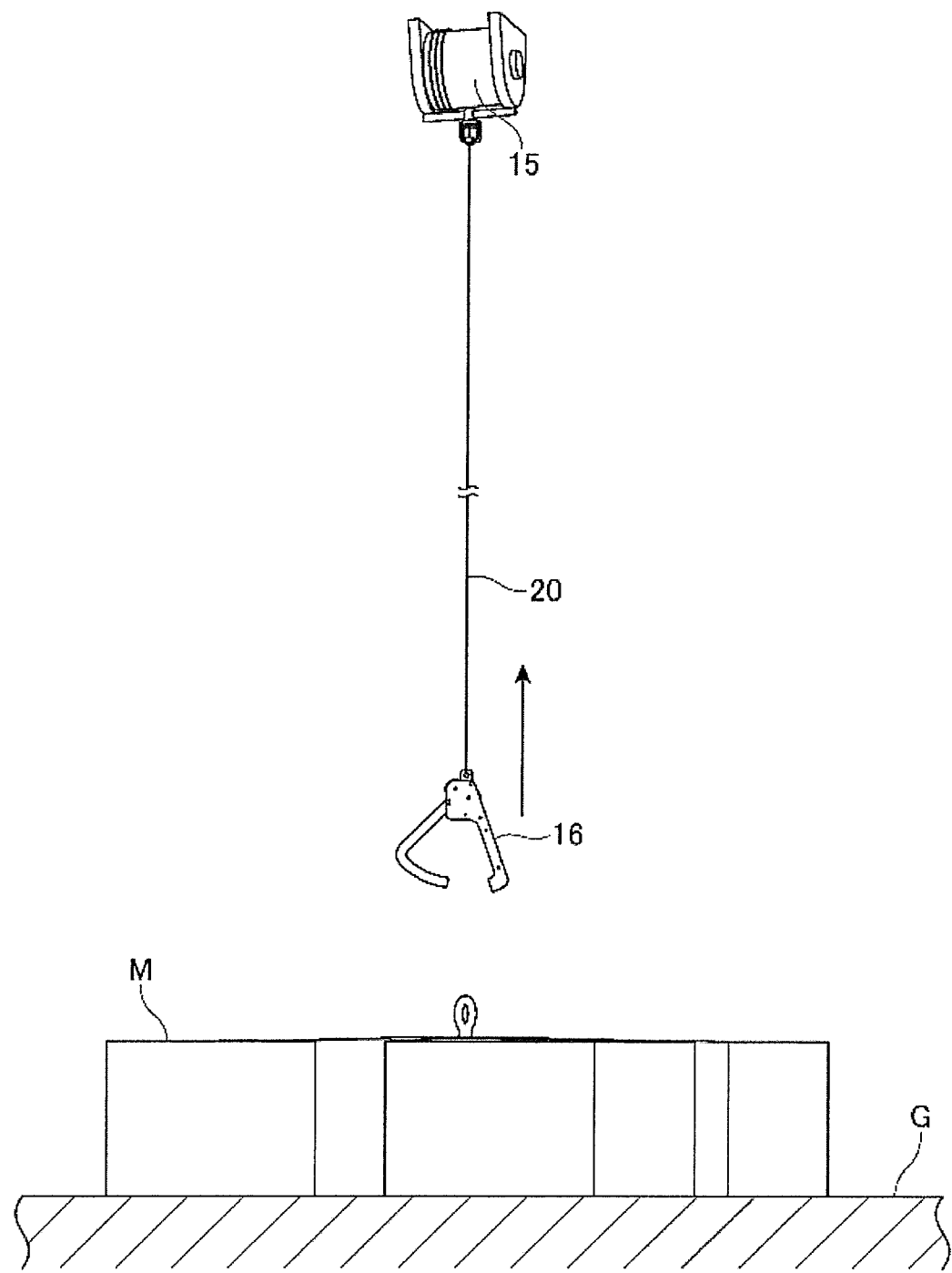
FIG. 3d shows a view illustrating the unwinding and winding of a wire from the unmanned aerial vehicle in FIG. 1.

As described above, when the cargo M is released from the hook 16, the tension T acting on the wire 20 becomes substantially equal to m1 so that the controller 50 can detect that the cargo M is released from the hook 16 based on the detection signal from the sensor 14. For example, the controller 50 can determine that the cargo M has been released from the hook 16 when the tension detected by the sensor 14 becomes less than a predetermined threshold value. The controller 50 may drive the motor 12b in the forward direction when determining that the cargo M has been released from the hook 16. The hook 16 from which the cargo M is released can be retrieved by driving the motor 12b in the forward direction after the cargo M is released. For example, as shown in FIG. 3d, after the cargo M is released from the hook 16, the wire 20 is wound onto the spool 15b. The wire 20 may be wound up until the hook 16 rises to a position where the flight of the unmanned aerial vehicle 1 is not hindered. When winding the wire 20 after release of the cargo M, the tension T exerted on the wire 20 becomes substantially equal to the gravitational force m1 acting on the hook 16 as described above. Therefore, by making the second threshold value S2 less than the gravitational force m1 acting on the hook 16 (namely, by letting S2<m1,) the tension T acting on the wire 20 becomes greater than the second threshold value S2 (S2<T,) so that the forward rotation of the spool 15b is not restricted during the winding of the wire 20 after the release of the cargo M. As a result, the wire 20 can be smoothly wound up until the hook 16 rises to a predetermined position.

Next, the effect of the above example will be described. In the above-described example, under the control of the controller 50, when the tension T of the wire 20 becomes equal to or less than the first threshold value S1, the backward rotation of the spool 15b is restricted (i.e., the backward rotation is prohibited,) and when the tension T becomes equal to or less than the second threshold value S2, the forward rotation of the spool 15*b* is restricted (i.e., the forward rotation is prohibited.) The second threshold value S2 is less than the first threshold value S1 and the gravitational force m1 acting on the hook 16, respectively. When winding the wire 20 after releasing the cargo M from the hook 16, the tension T of the wire 20 becomes substantially equal to the gravitational force m1 acting on the hook 16. In this manner, by making the second threshold value S2 for restricting the forward rotation less than the gravitational force m1 acting on the hook 16, the winding of the wire 20 after the release of the cargo M can be smoothly performed without restricting the forward rotation of the spool 15*b*. If the second threshold value S2 is set to a value equal to or greater than the gravitational force m1 acting on the hook 16, the tension T acting on the wire 20 after the release of the cargo M is the gravitational force m1 acting on the hook 16 so that the tension T becomes less than the second threshold value S2, which restricts the winding of the spool 15*b*. Therefore, if the second threshold value S2 is set to a value equal to or greater than the gravitational force m1 acting on the hook 16, the wire 20 cannot be retrieved. On the other hand, as in the above example, the wire 20 can be retrieved by making the second threshold value S2 less than the gravitational force m1 acting on the hook 16.

In the above example, the first threshold value S1 is greater than the gravitational force m1 acting on the hook 16. Thus, after the release of the cargo M from the hook 16, the tension T acting on the wire 20 can be made less than the first threshold value S1. Therefore, after the release of the cargo M from the hook 16, unnecessary unwinding of the wire 20 can be prevented by prohibiting the backward rotation of the spool 15*b*. This can prevent the wire 20 from loosening when the cargo M is released. If the first threshold value S1 is set to a value less than the gravitational force m1 acting on the hook 16, the wire 20 continues to be unwound as the backward rotation of the spool 15*b* is not restricted even after the cargo M is grounded. Therefore, if the first threshold value S1 is set to a value less than the gravitational force m1 acting on the hook 16, the amount of the wire 20 unwound after the cargo M is grounded becomes greater than that in the example in which the first threshold value S1 is set to a value greater than the gravitational force m1 acting on the hook 16, which makes the line become easier to slack off.

In the above example, the first threshold value S1 is less than the sum of the gravitational force m1 acting on the hook 16 and the gravitational force m2 acting on the cargo M. As a result, the tension T acting on the wire 20 can be made greater than the first threshold value S1 when the cargo M is descended from the sky toward the ground G so that the cargo M can be smoothly descended to the ground G without restricting the backward rotation of the spool 15*b*.

The dimensions, materials and arrangements of each component described herein are not limited to those explicitly described in the examples, and each component can be modified to have any dimension, material and arrangement that can be included within the scope of this disclosure. Further, components that are not explicitly described herein may be added to the described examples, or some of the components described in each example may also be omitted.

The above examples may be combined as appropriate. An aspect realized by combination of a plurality of examples may also be an example itself

What is claimed is:

1. An unmanned aerial vehicle comprising:
   a main body;
   a plurality of rotary wings provided on the main body;
   a wire for suspending an object from the main body;
   a hook attached to the wire;
   a winch for rotatably supporting a spool on which the wire is wound in forward and backward directions, winding the wire by rotating the spool in the forward direction and unwinding the wire by rotating the spool in the backward direction; and
   a controller that restricts backward rotation of the spool when tension of the wire becomes less than a first threshold value, and restricts forward rotation of the spool when the tension of the wire becomes less than the first threshold value and becomes equal to or less than a second threshold value, which is less than a gravitational force acting on the hook.

2. The unmanned aerial vehicle according to claim 1, wherein the first threshold value is greater than a gravitational force acting on the hook.

3. The unmanned aerial vehicle according to claim 1, wherein the first threshold value is less than a sum of the gravitational forces acting on the hook and a cargo, respectively.

* * * * *